US012641165B2

(12) United States Patent  
Dutta

(10) Patent No.: US 12,641,165 B2  
(45) Date of Patent: May 26, 2026

(54) TRANSPORTING VENDOR-SPECIFIC APPLICATION PROTOCOL

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 594 days.

(21) Appl. No.: 18/178,743

(22) Filed: Mar. 6, 2023

(65) Prior Publication Data

US 2024/0305702 A1     Sep. 12, 2024

(51) Int. Cl.  
    *H04L 69/16*     (2022.01)  
    *H04L 45/74*     (2022.01)  
    *H04L 69/329*     (2022.01)

(52) U.S. Cl.  
    CPC ............ *H04L 69/161* (2013.01); *H04L 45/74* (2013.01); *H04L 69/329* (2013.01)

(58) Field of Classification Search  
    CPC ..... H04L 69/161; H04L 45/74; H04L 69/329; H04L 45/7453; H04L 67/63; H04L 47/125; H04L 69/03; H04L 69/164; H04L 69/26  
    See application file for complete search history.

(56) References Cited

U.S. PATENT DOCUMENTS

| | | | | |
|---|---|---|---|---|
| 8,238,889 B1 * | 8/2012 | Vu | ........................... | H04W 4/60 |
| | | | | 455/414.3 |
| 8,515,403 B1 | 8/2013 | Vu | | |
| 2005/0160171 A1 * | 7/2005 | Rabie | .................. | H04L 41/0896 |
| | | | | 709/227 |
| 2011/0110374 A1 * | 5/2011 | Boucadair | ........... | H04L 61/2517 |
| | | | | 370/393 |
| 2012/0250682 A1 * | 10/2012 | Vincent | ............... | H04L 12/4633 |
| | | | | 370/392 |
| 2014/0056146 A1 * | 2/2014 | Hu | ......................... | H04L 47/825 |
| | | | | 370/235 |

(Continued)

OTHER PUBLICATIONS

Postel, J., "User Datagram Protocol." RFC 768, DOI 10.17487/ RFC0768 (Aug. 28, 1980): 1-3.

(Continued)

*Primary Examiner* — Liem H. Nguyen  
(74) *Attorney, Agent, or Firm* — Mendelsohn Dunleavy, P.C.; Steve Mendelsohn

(57) ABSTRACT

In certain embodiments, applications employ data packets having a transport header comprising (i) a port number field encoding a vendor private port number and (ii) a tuple field encoding a vendor unique port number comprising a Vendor Organizationally Unique Identifier (OUI) value and a vendor-specified Vendor Port value. This technique for allocating unique port numbers enables vendors to roll out vendor-proprietary applications at will and without involving any external party. This technique enables faster rollout of vendor-proprietary applications over standard transport protocols without needing to standardize or disclose the details of the application in the public domain. Once standardized, e.g., by the Internet Engineering Task Force (IETF), the technique enables any enterprise to roll out its custom/proprietary applications easily.

19 Claims, 5 Drawing Sheets

(56) References Cited

U.S. PATENT DOCUMENTS

| | | | | |
|---|---|---|---|---|
| 2015/0350094 A1* | 12/2015 | Izhak-Ratzin | ...... | H04L 47/2441 |
| | | | | 370/235 |
| 2018/0103123 A1* | 4/2018 | Skog | ........................ | H04L 69/14 |
| 2019/0312938 A1* | 10/2019 | Deng | .................... | H04L 69/163 |
| 2021/0075714 A1* | 3/2021 | Zhang | ..................... | H04L 45/50 |
| 2022/0217094 A1* | 7/2022 | Hewson | .............. | G06F 13/4068 |
| 2024/0267333 A1* | 8/2024 | Chu | ........................ | H04L 45/38 |

OTHER PUBLICATIONS

Postel, J., "Transmission Control Protocol", RFC 793, DOI 10.17487/ RFC0793, (Sep. 1981): 1-85.
Stewart, R., "Stream Control Transmission Protocol", RFC 4960, DOI 10.17487/RFC4960 (Sep. 2007): 1-152.
Narten, T., et al. "Guidelines for Writing an IANA Considerations Section in RFCs." RFC 5226, DOI 10.17487/ RFC5226 (May 2008): 1-27.
Extended European Search Report for corresponding European applicAtion No. 24159858; dated Sep. 23, 2024 (12 Pages).

* cited by examiner

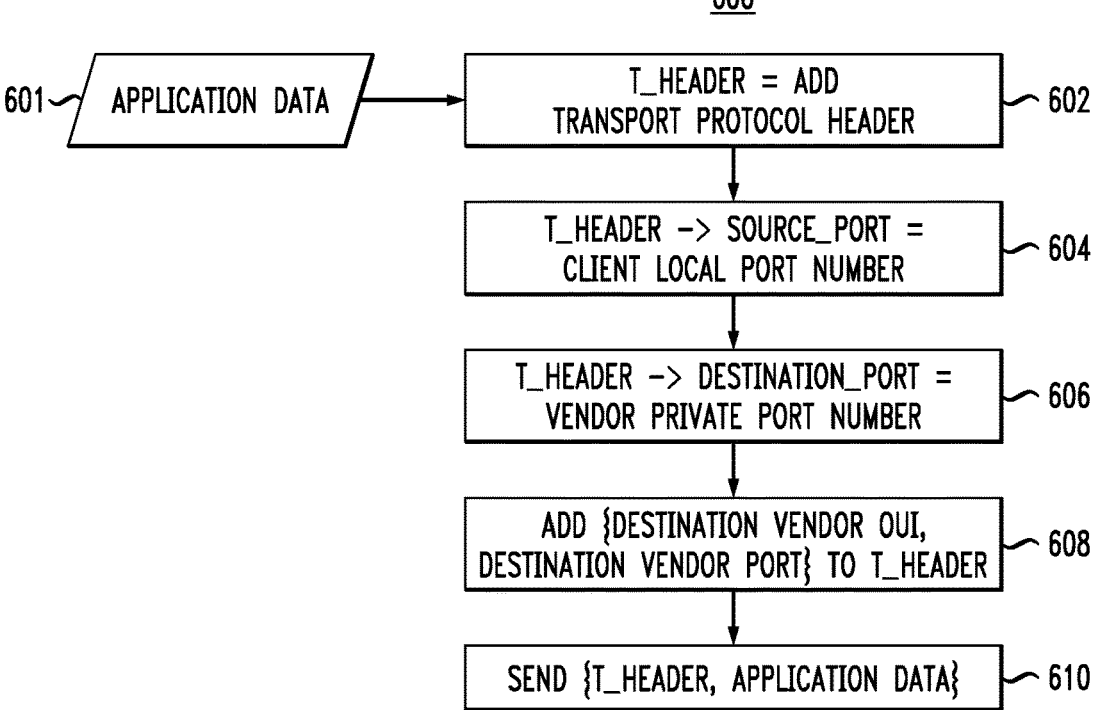

601 — APPLICATION DATA

T_HEADER = ADD TRANSPORT PROTOCOL HEADER — 602

T_HEADER -> SOURCE_PORT = CLIENT LOCAL PORT NUMBER — 604

T_HEADER -> DESTINATION_PORT = VENDOR PRIVATE PORT NUMBER — 606

ADD {DESTINATION VENDOR OUI, DESTINATION VENDOR PORT} TO T_HEADER — 608

SEND {T_HEADER, APPLICATION DATA} — 610

701 — APPLICATION DATA

T_HEADER = ADD TRANSPORT PROTOCOL HEADER — 702

T_HEADER -> DESTINATION_PORT = CLIENT LOCAL PORT NUMBER — 704

T_HEADER -> SOURCE_PORT = VENDOR PRIVATE PORT NUMBER — 706

ADD {SOURCE VENDOR OUI, SOURCE VENDOR PORT} TO T_HEADER — 708

SEND {T_HEADER, APPLICATION DATA} — 710

Figures 8, 9:
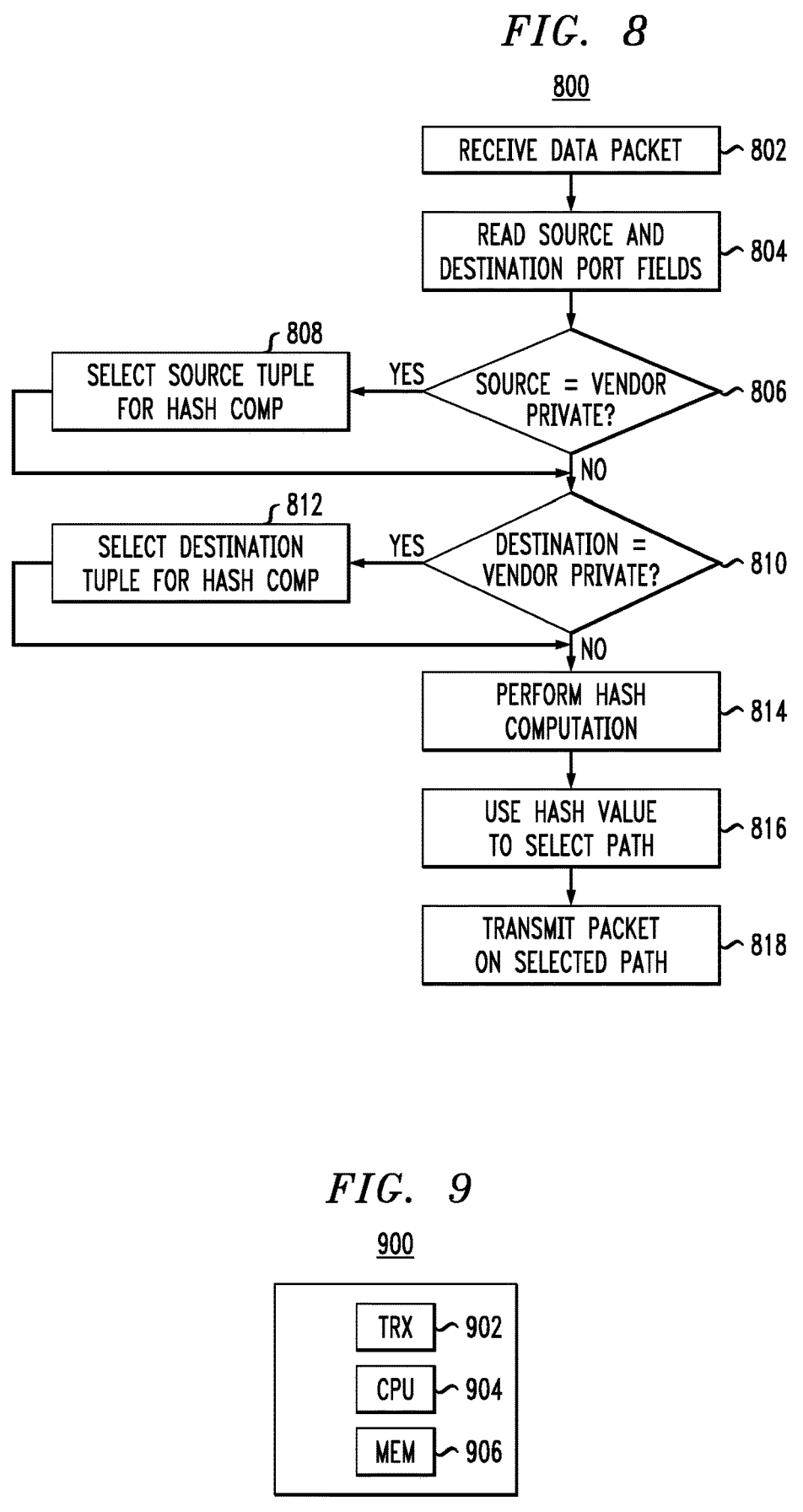

RECEIVE DATA PACKET ~ 802

READ SOURCE AND DESTINATION PORT FIELDS ~ 804

808
SELECT SOURCE TUPLE FOR HASH COMP ◄── YES ── SOURCE = VENDOR PRIVATE? ~ 806

NO

812
SELECT DESTINATION TUPLE FOR HASH COMP ◄── YES ── DESTINATION = VENDOR PRIVATE? ~ 810

NO

PERFORM HASH COMPUTATION ~ 814

USE HASH VALUE TO SELECT PATH ~ 816

TRANSMIT PACKET ON SELECTED PATH ~ 818

TRX ─ 902

CPU ─ 904

MEM ─ 906

TRANSPORTING VENDOR-SPECIFIC APPLICATION PROTOCOL

BACKGROUND

Field of the Disclosure

The present disclosure relates to inter-computer communications and, more specifically but not exclusively, to application-level protocols for transmitting data between different nodes of a distributed computer network.

Description of the Related Art

This section introduces aspects that may help facilitate a better understanding of the disclosure. Accordingly, the statements of this section are to be read in this light and are not to be understood as admissions about what is prior art or what is not prior art.

In certain situations, it is desirable for a vendor to deploy a proprietary application protocol quickly and efficiently. For example, in the DevOps model, the core focus is quick rollout of a vendor-proprietary application protocol without involving standardization or public disclosure of the protocol. The vendor may employ its own confidential technology in the protocol, which mandates keeping the details of the application private. Depending on the situation, the application protocol may be transported over any state-of-the-art transport protocol such as the Transmission Control Protocol (TCP), User Datagram Protocol (UDP), Stream Control Transmission Protocol (SCTP), Quick UDP Internet Connection (QUIC), or the like.

Proprietary protocols from multiple vendors cannot coexist in a network if applications across vendors overlap on the port number used by a transport protocol to uniquely identify the application. In the state of the art, there are two ways to allocate a unique port number to identify a vendor-proprietary application: (1) use one of the two Experimental Use port numbers (i.e., 1021 and 1022) in the Well-Known Ports range or (2) allocate a port number from the User Ports range (i.e., 1024 to 49151) in the Internet Assigned Numbers Authority (IANA) registry. The first approach has only two available port numbers, so that approach limits the maximum number of vendor-proprietary application protocols to two. The second approach has two major limitations. First, it takes a relatively long time for IANA to allocate a unique port number. In the DevOps model, a vendor needs to launch proprietary applications relatively quickly. Often experimental applications are launched to fulfill an immediate need in customer deployments where the experimental application is eventually replaced by a more mature and robust proprietary application after some time. Furthermore, the second approach requires the vendor to publicly disclose the intent and nature of the protocol, thereby preventing a vendor from deploying a proprietary protocol and keeping its underlying technology confidential. These limitations are stifling innovation in the vendor-proprietary application space, particularly in the DevOps model.

SUMMARY

Problems in the prior art are addressed in accordance with the principles of the present disclosure by flexible and generic techniques for unique port number allocation for vendor-proprietary applications so that vendors can roll out proprietary applications at will and without involving any external party. The present techniques enable faster rollout of vendor-proprietary applications over standard transport protocols without needing to standardize or disclose the details of the application in the public domain. Once standardized, e.g., by the Internet Engineering Task Force (IETF), the present techniques enable any enterprise to roll out its custom/proprietary applications easily.

In at least one embodiment of the present disclosure, data packets have a transport header comprising (i) a port number field encoding a vendor private port number and (ii) a tuple field encoding a vendor unique port number comprising a Vendor Organizationally Unique Identifier (OUI) value and a vendor-specified Vendor Port value.

In certain embodiments of the present disclosure, an apparatus comprises at least one processor and at least one memory storing instructions that, upon being executed by the at least one processor, cause the apparatus at least to process a data packet having a transport header comprising (i) a port number field encoding a vendor private port number and (ii) a tuple field encoding a vendor unique port number comprising a Vendor Organizationally Unique Identifier (OUI) value and a vendor-specified Vendor Port value.

In at least some of the above embodiments, the apparatus is a destination node that is configured to receive the data packet.

In at least some of the above embodiments, the apparatus is a source node that is configured to transmit the data packet.

In at least some of the above embodiments, the port number field encoding the vendor private port number is a destination port field, and the tuple field encodes a destination vendor unique port number comprising a destination Vendor OUI value and a destination Vendor Port value.

In at least some of the above embodiments, the port number field encoding the vendor private port number is a source port field, and the tuple field encodes a source vendor unique port number comprising a source Vendor OUI value and a source Vendor Port value.

In at least some of the above embodiments, a destination port field of the transport header also encodes a vendor private port number, and the tuple field further encodes a destination vendor unique port number comprising a destination Vendor OUI value and a destination Vendor Port value.

In at least some of the above embodiments, the transport header has a source port number field corresponding to a source node for the packet and a destination port number field corresponding to a destination node for the packet; the apparatus is a transit node located between the source node and the destination node; the transit node is configured to use a source vendor unique port number in the transport header instead of the source port number to compute a hash value for load balancing, upon determining that the source port number field encodes a vendor private port number; and the transit node is configured to use a destination vendor unique port number in the transport header instead of the destination port number to compute the hash value for load balancing, upon determining that the destination port number field encodes a vendor private port number.

In at least some of the above embodiments, the data packet is a TCP data packet having a TCP transport header, and the tuple field is located between an Urgent Pointer field and an Options field in the TCP transport header.

In at least some of the above embodiments, the data packet is a UDP data packet having a UDP transport header, and the tuple field is appended after a Checksum field in the UDP transport header.

In at least some of the above embodiments, the vendor private port number is a value in a Well-Known Ports space.

In at least some of the above embodiments, the Vendor OUI value is a three-byte value, and the Vendor Port value is a two-byte value.

In certain embodiments of the present disclosure, a method comprises a node (a) generating an outgoing data packet having outgoing application data and a transport header comprising (i) a port number field encoding a vendor private port number and (ii) a tuple field encoding a vendor unique port number comprising a Vendor Organizationally Unique Identifier (OUI) value and a vendor-specified Vendor Port value; (b) transmitting the outgoing data packet; (c) receiving an incoming data packet having incoming application data and a transport header comprising (i) a port number field encoding the vendor private port number and (ii) a tuple field encoding the vendor unique port number; and (c) recovering the incoming application data from the incoming data packet.

In at least some of the above embodiments, the port number field encoding the vendor private port number in the transport header of the outgoing data packet is a source port number field; the tuple field in the transport header of the outgoing data packet encodes a source vendor unique port number; the port number field encoding the vendor private port number in the transport header of the incoming data packet is a destination port number field; and the tuple field in the transport header of the incoming data packet encodes a destination vendor unique port number.

In at least some of the above embodiments, the port number field encoding the vendor private port number in the transport header of the outgoing data packet is a destination port number field; the tuple field in the transport header of the outgoing data packet encodes a destination vendor unique port number; the port number field encoding the vendor private port number in the transport header of the incoming data packet is a source port number field; and the tuple field in the transport header of the incoming data packet encodes a source vendor unique port number.

In at least some of the above embodiments, the data packet is a TCP data packet having a TCP transport header, and the tuple field is located between an Urgent Pointer field and an Options field in the TCP transport header.

In at least some of the above embodiments, the data packet is a UDP data packet having a UDP transport header, and the tuple field is appended after a Checksum field in the UDP transport header.

In at least some of the above embodiments, the vendor private port number is a value in a Well-Known Ports space.

In at least some of the above embodiments, the Vendor OUI value is a three-byte value, and the Vendor Port value is a two-byte value.

In certain embodiments of the present disclosure, a method comprises a transit node (a) receiving a data packet comprising a transport header having a source port number field corresponding to a source node for the packet and a destination port number field corresponding to a destination node for the packet; (b) performing a hash computation to generate a hash value for load balancing using at least one of (i) a source vendor unique port number in the transport header instead of the source port number upon determining that the source port number field encodes a vendor private port number and (ii) a destination vendor unique port number in the transport header instead of the destination port number upon determining that the destination port number field encodes a vendor private port number; (c) performing load balancing using the hash value to select a path; and (d) transmitting the data packet over the selected path.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 6 is a flow diagram of a method for transporting a vendor private protocol packet from a client to a server according to an embodiment of the present disclosure; and FIG. 7 is a flow diagram of a method for transporting a vendor private protocol packet from a server to a client according to an embodiment of the present disclosure;

FIG. 8 is a flow diagram of processing performed by a transit node, according to an embodiment of the present disclosure; and FIG. 9 is a simplified block diagram of a generic node that can be used to implement a node (e.g., Server S or Client M or N of FIG. 1) of the present disclosure.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
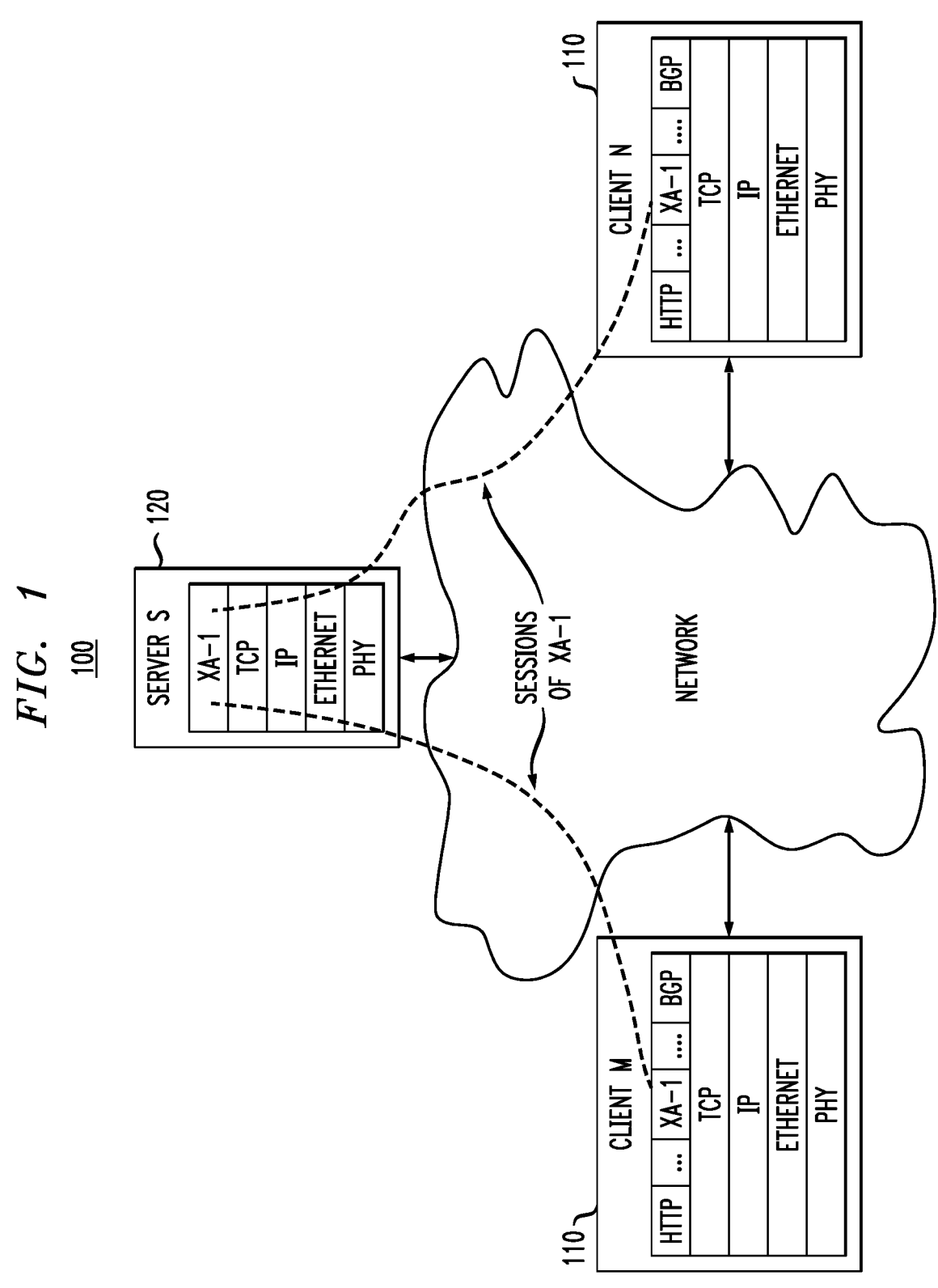
FIG. 1 is a block diagram of an example distributed network that employs one possible TCP version of the present disclosure.

FIG. 1 illustrates the deployment of a vendor-proprietary application protocol XA-1 over TCP in a distributed network 100. In FIG. 1, the network nodes 110 (i.e., Clients M and N) (e.g., switches, routers in the network) are running the client side of an application developed by a vendor and exchanging application data using the corresponding XA-1 protocol with a centralized node 120 (i.e., Server S) running the server side of the application. Each client sets up a TCP session with the server over which application data is exchanged. For example, the application may execute a vendor-specific telemetry function to gather telemetry data from each client and report the data to the centralized server.

To deploy the application in FIG. 1, first, a TCP port number is required to identify the application. The TCP module in the server will listen on that port number for incoming connection requests from clients. Clients send TCP connection requests for the application server with a locally allocated TCP port number from the Dynamic Ports range (i.e., ports 49152-65535) as the source port in the TCP header and the port number of the application as the destination port in the TCP header.

After the TCP connection is established, a client will send all packets for the application to the server by encapsulating the packets with a TCP header wherein the locally allocated TCP port number is the source port in the TCP header and the application port number is the destination port in the TCP header. Analogously, the server will send all packets for the application to a client by encapsulating the packets with a TCP header wherein the application port number is the source port in the TCP header and the port number locally allocated by the client is the destination port in the TCP header. A TCP packet is in turn encapsulated by an IP header which in turn is encapsulated by a data link layer header, such as ethernet, before the packet is sent out on the wire.

The source and destination ports are allocated and used in an analogous way if the transport protocol is UDP or SCTP instead of TCP, and QUIC uses UDP as the underlying transport protocol.

According to the present disclosure, at least one new port number is allocated from the Well-Known Ports range 1-1024 to indicate "any" vendor proprietary application as the payload of a transport protocol. Such a new port number is referred to as a "vendor private port number". One possible value in the Well-Known Ports range for a vendor private port number is 1002, which is currently unassigned, although any other currently unassigned port number in the Well-Known Ports range could be selected. Since a vendor private port number is a Well-Known Ports number, it is to be allocated and standardized (via RFC) after approval by the IANA.

According to certain embodiments of the present disclosure, if a vendor private port number is used for a specific vendor proprietary application, then the application is further identified by a tuple {Vendor OUI, Vendor Port}, which is included in the header of the transport protocol, where Vendor OUI is the 24-bit Organizationally Unique Identifier assigned to the vendor by the IEEE and Vendor Port is a 16-bit port value assigned by the vendor for its specific application. The tuple is referred to as the "vendor unique port number" and is included in the transport protocol header if the source or destination port number in the transport protocol header (e.g., TCP, UDP, SCTP, and the like) is a vendor private port number. The Vendor Port space is exclusively managed by the vendor, which can allocate any port number in this space to uniquely identify a proprietary application developed by the vendor. This technique enables a vendor to roll out a proprietary application at any time since the vendor exclusively controls its Vendor Port space. Thus, two or more orthogonal applications across two or more different vendors can use the same vendor private port number (in the source or destination port field) and the same Vendor Port number (in the tuple) since the applications are distinguished by the vendor unique values in the Vendor OUI field. Furthermore, a single vendor can simultaneously deploy multiple applications using the same vendor private port number (in the source or destination port field) and the same Vendor OUI field (in the tuple) since the applications can be distinguished by the vendor assigning unique values for the Vendor Port number.

When a transport protocol packet is received with a vendor private port number as either the source port number or the destination port number, the vendor private port number indicates that the payload corresponds to a vendor proprietary application. To uniquely identify the application, the receiver looks at the tuple {Vendor OUI, Vendor Port} that represents the vendor unique port number, where the Vendor OUI uniquely identifies the vendor, and the Vendor Port uniquely identifies the application within the vendor.

Figure 2:
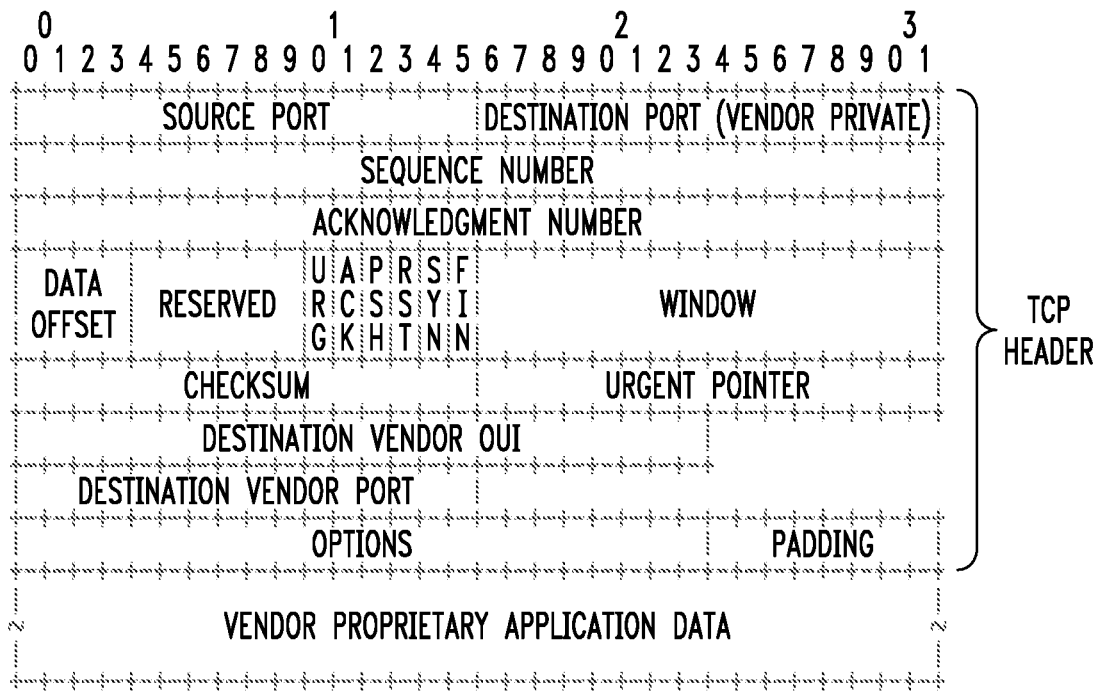
FIG. 2 is a diagram representing a vendor private protocol packet transmitted from a TCP client to a TCP server according to one possible TCP version of the present disclosure.

FIG. 2 shows the format for the transport header for a TCP packet for a vendor proprietary application sent from a client (e.g., Client M or N of FIG. 1) to a server (e.g., Server S of FIG. 1), according to one possible implementation. In that case, the Destination Port field is encoded with a vendor private port number, which indicates the presence of a "destination" vendor unique port number (i.e., the tuple {Destination Vender OUI, Destination Vendor Port}) in the TCP header. In this implementation, the destination vendor unique port number is located after the Urgent Pointer field and before the Options field of the otherwise standard TCP header format. The Data Offset field indicates the size of the TCP header in an integer number of 32-bit words. Since the destination vendor unique port number increases the size of the TCP header by 5 bytes, the Data Offset value is increased to accommodate the destination vendor unique port number. Note that extra bytes may need to be added in the Padding field to round up the TCP header to an integer number of 32-bit words.

Figure 3:
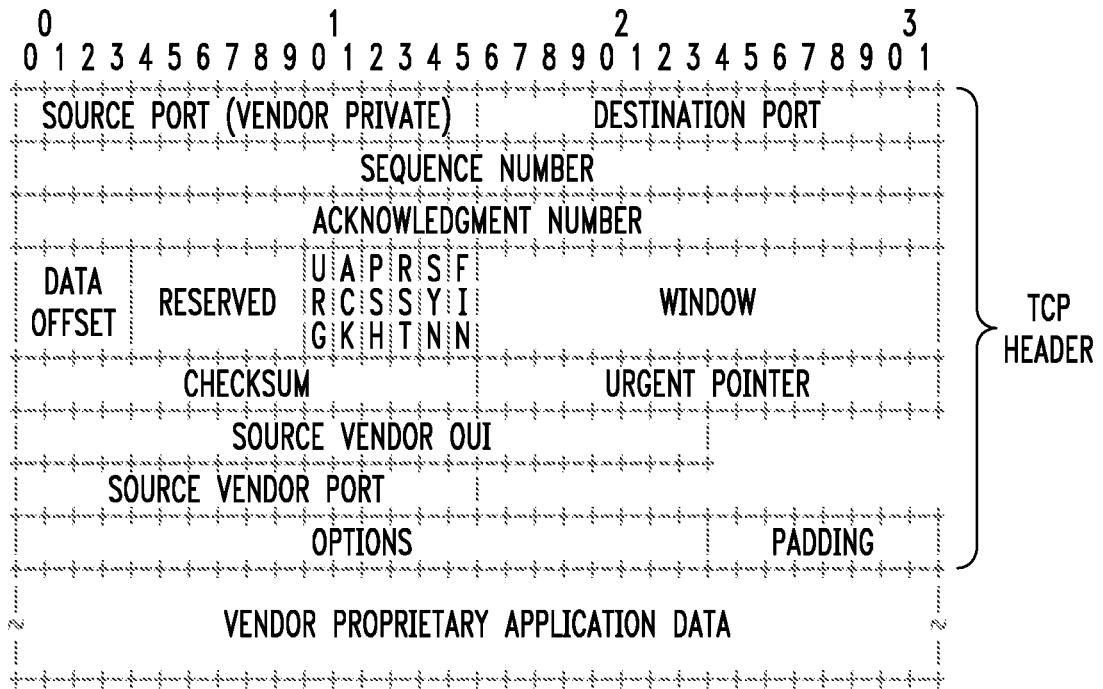
FIG. 3 is a diagram representing a vendor private protocol packet transmitted from a TCP server to a TCP client according to the TCP version of FIG. 2.

FIG. 3 shows the format for the transport header for a TCP packet for a vendor proprietary application sent from a server (e.g., Server S of FIG. 1) to a client (e.g., Client M or N of FIG. 1), according one possible implementation. In that case, the Source Port field is encoded with a vendor private port number, which indicates the presence of a "source" vendor unique port number (the tuple {Source Vendor OUI, Source Vendor Port}) in the TCP header. In this implementation, the source vendor unique port number is located after the Urgent Pointer field and before the Options field of the otherwise standard TCP header format. Since the source vendor unique port number increases the size of TCP header by 5 bytes, the Data Offset value is increased to accommodate the source vendor unique port number. Here, too, extra bytes may need to be added in Padding field to round up the TCP header to an integer number of 32-bit words.

Figure 4:
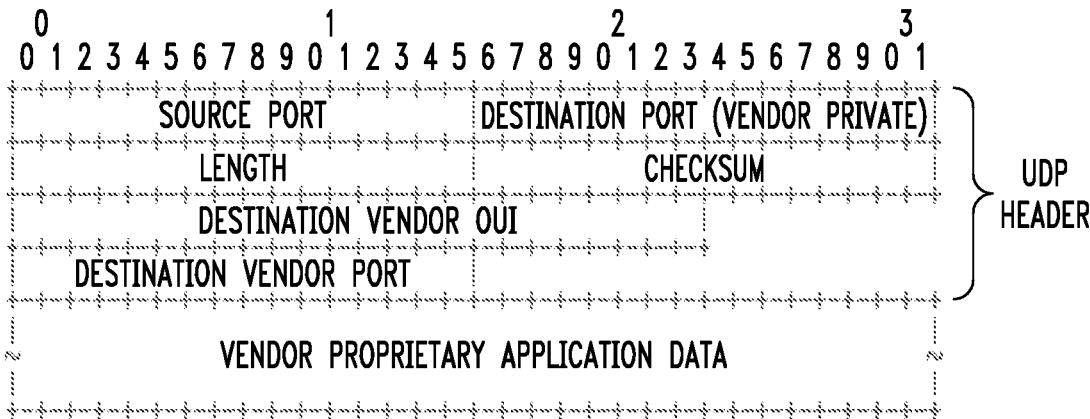
FIG. 4 is a diagram representing a vendor private protocol packet transmitted from a UDP client to a UDP server according to one possible UDP version of the present disclosure.

FIG. 4 shows the format for the transport header for a UDP packet for a vendor proprietary application sent from a client to a server, according one possible implementation. In that case, the Destination Port field is encoded with a vendor private port number, which indicates the presence of the destination vendor unique port number in the UDP header. In this implementation, the corresponding tuple is appended after the Checksum field of the otherwise standard UDP header format. The Length field indicates the size of the UDP header and its payload (Application Data). Since the destination vendor unique port number increases the size of UDP header by 5 bytes, the Length value is increased by 5 bytes to accommodate the destination vendor unique port number.

Figure 5:
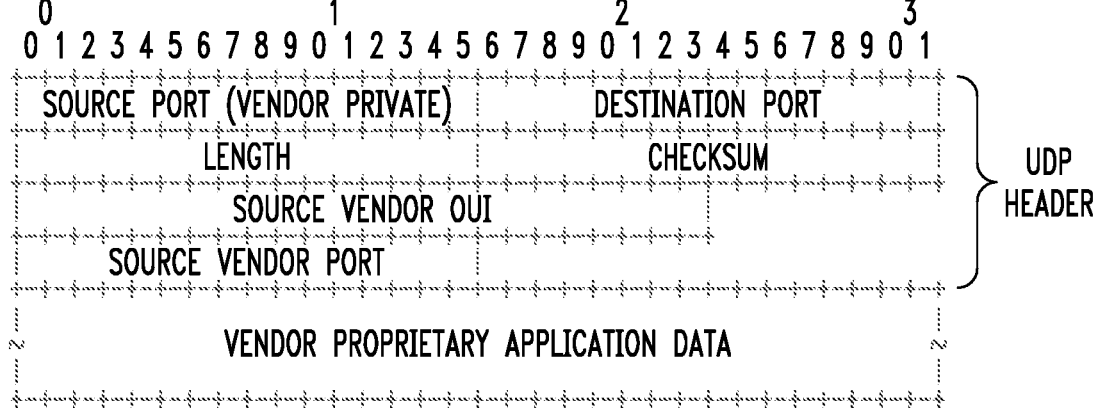
FIG. 5 is a diagram representing a vendor private protocol packet transmitted from a UDP server to a UDP client according to the UDP version of FIG. 4.

FIG. 5 shows the format for the transport header for a UDP packet for a vendor proprietary application sent from a server to a client, according one possible implementation. In that case, the Source Port field is encoded with a vendor private port number, which indicates the presence of the source vendor unique port number in the UDP header. Here, too, the corresponding tuple is appended after the Checksum field of the otherwise standard UDP header format. Since the source vendor unique port number increases the size of UDP header by 5 bytes, the Length value is increased by 5 bytes to accommodate the source vendor unique port number.

FIG. 6 is a flow diagram 600 illustrating a method implemented by a client (e.g., Client M or N of FIG. 1) to transport vendor-proprietary application data 601 from the client to a server (e.g., Server S of FIG. 1) using a transport protocol, according to one implementation. The input to the method is a chunk of data corresponding to the vendor-proprietary application protocol. At step 602, the client encapsulates the input data with the header of the transport protocol. At step 604, the client encodes the source port of the transport header with the local port number assigned by the client. At 606, the client encodes the destination port of the transport header with a vendor private port number. At step 608, the client adds the tuple {Destination Vendor OUI, Destination Vendor Port} into the transport header. At step 610, the client sends the transport packet to the server.

FIG. 7 is a flow diagram 700 illustrating a method implemented by a server (e.g., Server S of FIG. 1) to transport vendor-proprietary application data 701 from the server to a client (e.g., Client M or N of FIG. 1) using a transport protocol, according to one implementation. The input to the method is a chunk of data corresponding to the vendor-proprietary application protocol. At step 702, the server encapsulates the input data with the header of the transport protocol. At step 704, the server encodes the destination port of the transport header with the local port number assigned by the client. At step 706, the server encodes the source port of the transport header with a vendor private port number. At step 708, the server adds the tuple {Source Vendor OUI, Source Vendor Port} into the transport header. At step 710, the server sends the transport packet to the server.

The present disclosure has been described in the context of server-client relationships between pairs of nodes in a distributed network where the server port is a vendor private port number and the client port is selected by the client, where the server port tuple contains the Vendor OUI followed by the Vendor Port. In general, the present disclosure can be implemented in other contexts, such as server-client relationships or peer-to-peer relationships, in which either or both nodes have a port number that is a vendor private port number, and the transport header includes one or two tuples, each tuple having a Vendor OUI and a Vendor Port and in some specified order. In one possible implementation, if both nodes have vendor private port numbers, then the transport header will have two tuples: the source tuple {Source Vendor OUI, Source Vendor Port} followed by the destination tuple {Destination Vendor OUI, Destination Vendor Port}. In another possible implementation, the destination tuple will be followed by the source tuple. If both nodes have vendor private port numbers, those two vendor private port numbers may be the same or they may be different. In one possible implementation, if both nodes have either the same or different vendor private port numbers and if both tuples have the same Vendor OUI, then the transport header can have a single tuple containing three values: the common Vendor OUI number, the Source Vendor Port number, and the Destination Vendor port number in some specified order.

Intermediate transit nodes, if any, in the network compute a hash to forward the packets of the TCP connection on a specific path when there are multiple paths to the destination. This is typically termed as "L4 load balancing" or "flow-based load balancing" since the transit nodes look at the layer 4 header (transport layer header) fields to uniquely identify a transport connection and perform load balancing.

If and when a transit node receives a packet that needs to be load balanced over multiple paths, the transit node looks up the source port and destination port fields in the transport header for its hash computation. If the source port field encodes a vendor private port number, then the transit node uses the corresponding tuple {Source Vendor OUI, Source Vendor Port} for its hash computation instead of the source port number. Furthermore, if the destination port field encodes a vendor private port number, then the transit node uses the corresponding tuple {Destination Vendor OUI, Destination Vendor Port} for its hash computation instead of the destination port number.

FIG. 8 is a flow diagram 800 illustrating the processing by a transit node according to an implementation of the disclosure. In step 802, the transit node receives a packet that needs to be load balanced for multiple available paths. The default is for the transit node to use the packet's source and destination port numbers in the transit node's hash computation for load balancing. In step 804, the transit node reads the source and destination port fields in the packet's transport header.

In step 806, the transit node determines whether the source port number is a vendor private port number. If not, then processing continues to step 810. Otherwise, in step 808, the transit node reads the corresponding tuple {Source Vendor OUI, Source Vendor Port} from the transport header and selects that tuple for use in the hash computation instead of the default source port number. Processing then continues to step 810.

In step 810, the transit node determines whether the destination port number is a vendor private port number. If not, then processing continues to step 814. Otherwise, in step 812, the transit node reads the corresponding tuple {Destination Vendor OUI, Destination Vendor Port} from the transport header and selects that tuple for use in the hash computation instead of the default destination port number. Processing then continues to step 814.

In step 814, the transit node performs its hash computation using one or both default values and/or the one or both values selected in steps 808 and/or 812. If the source port is a vendor private port number, then the 7-byte tuple {Source Vendor OUI, Source Vendor Port, Destination Port} may be used for the hash computation. Typically, a hash computation is performed by computing a 32-bit or 64-bit value from a 56-bit tuple. The hash computation can be performed with a 64-bit value by using the 7-byte tuple as the lower 56 bits of the 64-bit value and setting the upper 8 bits to 0, where hash=(Source Vendor OUI<<32)|(Source Vendor Port<<16) |(Destination Port), where "<<" represents the left shift operator and "|" represents the binary OR operator. For a 32-bit value, one way to compute is hash=(Source Vendor OUI<<8)|(Source Vendor Port<<8)|(Destination Vendor Port). The path can be selected based on the number of available paths as (hash % number_of_paths), where "%" represents the modulo operation. If the destination port is a vendor private port number, then the 7-byte tuple {Destination Vendor OUI, Destination Vendor Port, Source Port} may be used for the hash computation in a similar way.

In step 816, the transit node uses the resulting computed hash value to select one of the available multiple paths for the packet and, in step 818, the transit node sends the packet along that selected path.

Once the IETF has allocated a value in the Well-Known Ports space as a vendor private port number, any vendor can use that vendor private port number to indicate the presence of the tuple {Vendor OUI, Vendor Port} that represents the vendor unique port number for the vendor's proprietary application.

FIG. 9 is a simplified hardware block diagram of an example node 900 that can be used to implement any of the nodes (e.g., servers, clients, peers, transit nodes) of the present disclosure, including the nodes of FIG. 1. As shown in FIG. 9, the node 900 includes (i) communication hardware (e.g., wireless, wireline, and/or optical transceivers (TRX)) 902 that supports communications with other nodes, (ii) a processor (e.g., CPU microprocessor) 904 that controls the operations of the node 900, and (iii) a memory (e.g., RAM, ROM) 906 that stores code executed by the processor 904 and/or data generated and/or received by the node 900.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. An apparatus comprising:
at least one processor; and
at least one memory storing instructions that, upon being executed by the at least one processor, cause the apparatus at least to process a data packet having a transport header comprising:
a port number field encoding a vendor private port number; and
a tuple field different from the port number field and encoding a vendor unique port number different from the vendor private port number and comprising a Vendor Organizationally Unique Identifier (OUI) value and a vendor-specified Vendor Port value different from the vendor private port number.

2. The apparatus of claim 1, wherein the apparatus is a destination node that is configured to receive the data packet.

3. The apparatus of claim 1, wherein the apparatus is a source node that is configured to transmit the data packet.

4. The apparatus of claim 1, wherein:
the port number field encoding the vendor private port number is a destination port field; and
the tuple field encodes a destination vendor unique port number comprising a destination Vendor OUI value and a destination Vendor Port value.

5. The apparatus of claim 1, wherein:
the port number field encoding the vendor private port number is a source port field; and
the tuple field encodes a source vendor unique port number comprising a source Vendor OUI value and a source Vendor Port value.

6. The apparatus of claim 5, wherein:
a destination port field of the transport header also encodes a vendor private port number; and
the tuple field further encodes a destination vendor unique port number comprising a destination Vendor OUI value and a destination Vendor Port value.

7. The apparatus of claim 1, wherein:
the transport header has a source port number field corresponding to a source node for the packet and a destination port number field corresponding to a destination node for the packet;
the apparatus is a transit node located between the source node and the destination node;
the transit node is configured to use a source vendor unique port number in the transport header instead of the source port number to compute a hash value for load balancing, upon determining that the source port number field encodes a vendor private port number; and
the transit node is configured to use a destination vendor unique port number in the transport header instead of the destination port number to compute the hash value for load balancing, upon determining that the destination port number field encodes a vendor private port number.

8. The apparatus of claim 1, wherein:
the data packet is a TCP data packet having a TCP transport header; and
the tuple field is located between an Urgent Pointer field and an Options field in the TCP transport header.

9. The apparatus of claim 1, wherein:
the data packet is a UDP data packet having a UDP transport header; and
the tuple field is appended after a Checksum field in the UDP transport header.

10. The apparatus of claim 1, wherein the vendor private port number is a value in a Well-Known Ports space.

11. The apparatus of claim 1, wherein:
the Vendor OUI value is a three-byte value; and
the Vendor Port value is a two-byte value.

12. A method comprising a node:

generating an outgoing data packet having outgoing application data and a transport header comprising:

a port number field encoding a vendor private port number; and a tuple field different from the port number field and encoding a vendor unique port number different from the vendor private port number and comprising a Vendor Organizationally Unique Identifier (OUI) value and a vendor-specified Vendor Port value different from the vendor private port number;

transmitting the outgoing data packet;

receiving an incoming data packet having incoming application data and a transport header comprising:

a port number field encoding the vendor private port number; and a tuple field encoding the vendor unique port number; and recovering the incoming application data from the incoming data packet.

13. The method of claim 12, wherein:

the port number field encoding the vendor private port number in the transport header of the outgoing data packet is a source port number field;

the tuple field in the transport header of the outgoing data packet encodes a source vendor unique port number;

the port number field encoding the vendor private port number in the transport header of the incoming data packet is a destination port number field; and the tuple field in the transport header of the incoming data packet encodes a destination vendor unique port number.

14. The method of claim 12, wherein:

the port number field encoding the vendor private port number in the transport header of the outgoing data packet is a destination port number field;

the tuple field in the transport header of the outgoing data packet encodes a destination vendor unique port number;

the port number field encoding the vendor private port number in the transport header of the incoming data packet is a source port number field; and the tuple field in the transport header of the incoming data packet encodes a source vendor unique port number.

15. The method of claim 12, wherein:

the data packet is a TCP data packet having a TCP transport header; and the tuple field is located between an Urgent Pointer field and an Options field in the TCP transport header.

16. The method of claim 12, wherein:

the data packet is a UDP data packet having a UDP transport header; and the tuple field is appended after a Checksum field in the UDP transport header.

17. The method of claim 12, wherein the vendor private port number is a value in a Well-Known Ports space.

18. The method of claim 12, wherein:

the Vendor OUI value is a three-byte value; and the Vendor Port value is a two-byte value.

19. A method comprising a transit node:

receiving a data packet comprising a transport header having (i) a source port number field corresponding to a source node for the packet, (ii) a destination port number field corresponding to a destination node for the packet, and (iii) either (1) a source vendor unique port number different from the source port number field or (2) a destination vendor unique port number different from the destination port number field;

performing a hash computation to generate a hash value for load balancing using at least one of:

(i) the source vendor unique port number in the transport header instead of the source port number upon determining that the source port number field encodes a vendor private port number; and (ii) the destination vendor unique port number in the transport header instead of the destination port number upon determining that the destination port number field encodes a vendor private port number;

performing load balancing using the hash value to select a path; and transmitting the data packet over the selected path.

* * * * *